US009858325B1

(12) United States Patent
Suver et al.

(10) Patent No.: US 9,858,325 B1
(45) Date of Patent: Jan. 2, 2018

(54) CONSOLIDATING DATA IN STORAGE HOST GROUPINGS

(71) Applicant: Amazon Technologies, Inc., Reno, NV (US)

(72) Inventors: Claire E. Suver, Seattle, WA (US); Bryan James Donlan, Seattle, WA (US); Paul David Franklin, Seattle, WA (US); James Caleb Kirschner, Seattle, WA (US); James Christopher Sorenson, III, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 220 days.

(21) Appl. No.: 14/500,782

(22) Filed: Sep. 29, 2014

(51) Int. Cl.
   *G06F 7/00* (2006.01)
   *G06F 17/30* (2006.01)

(52) U.S. Cl.
   CPC .. *G06F 17/30575* (2013.01); *G06F 17/30598* (2013.01)

(58) Field of Classification Search
   CPC ......... G06F 17/30575; G06F 17/30598; G06F 3/0608; G06F 3/0604; G06F 3/0626; G06F 3/0655; G06F 3/067; G06F 3/0683; G06F 11/2094; G06F 17/30135
   USPC .................. 707/812, 609, 693, 699, 999.101
   See application file for complete search history.

(56) References Cited

U.S. PATENT DOCUMENTS

| | | | | |
|---|---|---|---|---|
| 5,239,659 A | * | 8/1993 | Rudeseal | G06F 3/0601 703/24 |
| 5,778,393 A | * | 7/1998 | Blea | G06F 3/0614 707/700 |
| 6,314,503 B1 | * | 11/2001 | D'Errico | G06F 3/061 711/153 |
| 7,130,973 B1 | * | 10/2006 | Chong, Jr. | G06F 11/1662 711/112 |
| 7,937,617 B1 | * | 5/2011 | Nagineni | G06F 11/2092 714/13 |
| 8,484,259 B1 | * | 7/2013 | Makkar | G06F 17/30979 707/769 |
| 8,819,351 B2 | * | 8/2014 | Ripberger | G06F 11/2066 711/152 |
| 8,856,619 B1 | * | 10/2014 | Cypher | G06F 11/1044 714/6.2 |
| 9,092,441 B1 | * | 7/2015 | Patiejunas | G06F 17/30073 |
| 2007/0245083 A1 | * | 10/2007 | Margolus | G06F 11/1096 711/114 |

(Continued)

*Primary Examiner* — Mohammed R Uddin
(74) *Attorney, Agent, or Firm* — Davis Wright Tremaine LLP

(57) ABSTRACT

A data storage service distributes a plurality of data fragments corresponding to a data object among one or more data storage host groupings in a manner that avoids a possibility of correlated loss of multiple data fragments by consolidation of data of a data storage host grouping onto a single data storage host. The data storage service selects a data storage host grouping and determines an amount of used capacity for the selected data storage host grouping. If the selected grouping satisfies an emptiness threshold, the data storage service selects a data storage host from the grouping and consolidates one or more data sets of the grouping onto the selected data storage host. Subsequently, the data storage service updates metadata for each data storage host of the selected data storage host grouping to specify a location of data stored therein.

22 Claims, 9 Drawing Sheets

(56) References Cited

U.S. PATENT DOCUMENTS

| | | | | |
|---|---|---|---|---|
| 2008/0091916 A1* | 4/2008 | Hashemi | G06F 3/0607 | 711/209 |
| 2008/0221856 A1* | 9/2008 | Dubnicki | G06F 3/0608 | 703/21 |
| 2009/0204652 A1* | 8/2009 | Chikusa | G06F 17/30067 | |
| 2011/0066793 A1* | 3/2011 | Burd | G06F 11/1028 | 711/103 |
| 2011/0072230 A1* | 3/2011 | Dudgeon | G06F 3/0608 | 711/165 |
| 2013/0073821 A1* | 3/2013 | Flynn | G06F 3/061 | 711/162 |
| 2013/0138851 A1* | 5/2013 | Dominguez | G06F 3/061 | 710/300 |
| 2013/0275802 A1* | 10/2013 | Endo | G06F 11/1076 | 714/6.23 |
| 2014/0324793 A1* | 10/2014 | Glazemakers | G06F 3/0641 | 707/692 |

* cited by examiner

CONSOLIDATING DATA IN STORAGE HOST GROUPINGS

BACKGROUND

Data storage services have evolved and continue to evolve to keep up with the demands of the organizations that use them. Many organizations, for example, utilize data storage services for, among other reasons, the purpose of data archiving, redundancy, and storage of large amounts of data. This data is stored in a variety of storage hosts, which provide available capacity for data storage. These storage hosts include metadata that may specify what data is stored therein. As the data stored within storage hosts provided by the data storage services becomes obsolete, these organizations may issue requests to these data storage services to delete the obsolete data, causing the storage hosts to gradually empty. However, each storage host still maintains its own metadata while storing less data over time, increasing the cost of data storage as these storage hosts empty.

BRIEF DESCRIPTION OF THE DRAWINGS

Various embodiments in accordance with the present disclosure will be described with reference to the drawings, in which.

DETAILED DESCRIPTION

Figure 1:
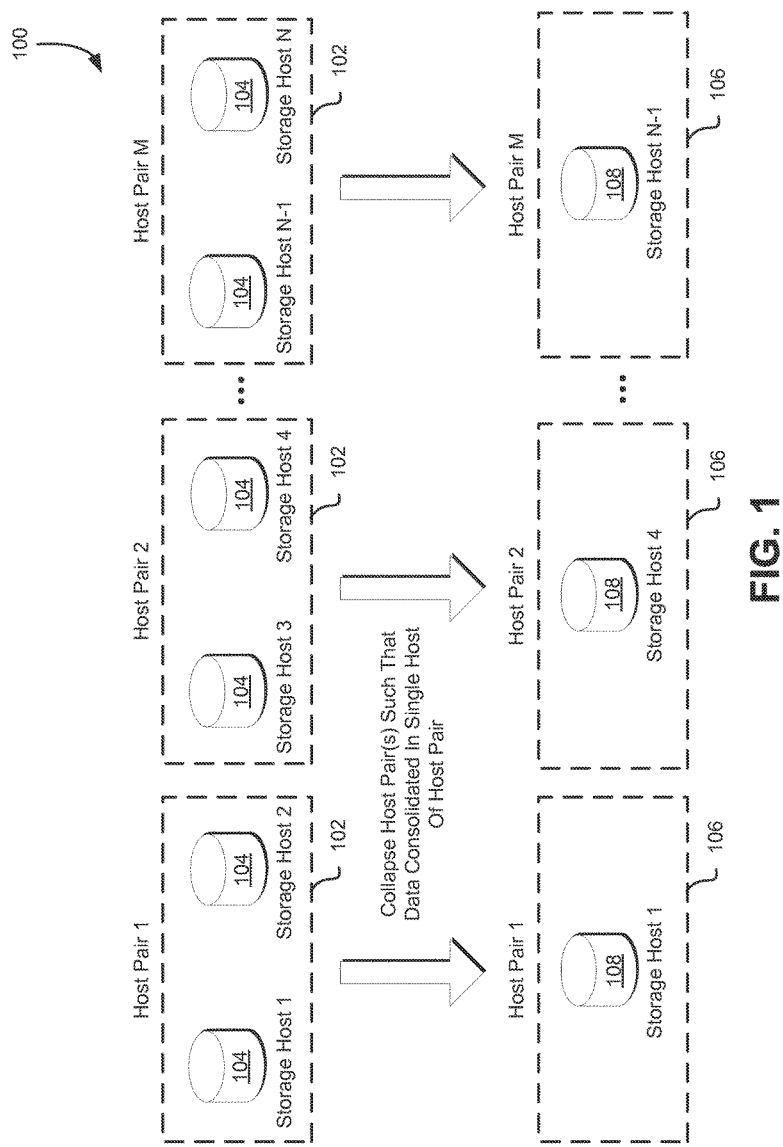
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the consolidation of data within a data storage host grouping by transferring data from each of the data storage hosts within the grouping to a smaller subset of data storage hosts. In an embodiment, a data storage service is configured to analyze one or more data storage host groupings to identify any data storage host groupings that include a plurality of data storage hosts that should be consolidated. For instance, the data storage service may access a data storage host grouping and evaluate each data storage host within the grouping to determine the available data storage capacity of the host. Based on the total available data storage capacity of the grouping, the data storage service may determine whether the data storage hosts within the grouping should be consolidated. The data storage service may comprise a collection of computing resources that collectively operate to store data for customers.

In an embodiment, the data storage service is configured to utilize a redundancy encoding scheme to encode a data object provided by a customer into a plurality of data fragments (also referred to as data shards or simply shards). In some embodiments, each fragment contains a copy of an entire data object. In other embodiments, each data fragment may contain less than all the data in the data object but more than its proportional share of data such that the combination of data in all data fragments may be greater than that of the parent data object. Thus, not all data fragments are required to recompile the parent data object. The data storage service may distribute the plurality of data fragments among at least a subset of the plurality of data storage host groupings or pairs. The distribution of the plurality of data fragments may be performed to avoid a possibility of correlated loss of multiple data fragments of the plurality of data fragments by consolidation of data of a data storage host grouping or pair onto a single data storage host. As an example, data fragments may be stored among a plurality of pairs such that no pair receives two shards of the same data object. In this manner, even after consolidation of the data of the pair onto a single data storage host, a failure of the data storage host causing a loss of more than one shard is avoided, thereby maintaining a durability of the data object even after the consolidation.

If the data storage service is able to identify a data storage host grouping that comprises a plurality of data storage hosts that should be consolidated, the data storage service may identify a subset of the data storage host grouping capable of storing data sets stored within the data storage host grouping. These data sets may comprise a plurality of data fragments corresponding to one or more data objects that have been redundancy encoded to ensure a certain level of data durability. If the data storage host grouping comprises two data storage hosts, the data storage service may determine which of the two data storage hosts is capable of storing the data for the entire data storage host grouping. Once the data storage service has identified an appropriate subset of the plurality of data storage hosts within the grouping capable of storing all the data for the grouping, the data storage service may transfer data from the grouping to this subset of data storage hosts.

In an embodiment, once the data within the data storage host grouping has been consolidated within a subset of the data storage hosts of the grouping, the data storage service updates the metadata stored within each data storage host and associated with the subset of the data storage hosts to specify that consolidated data is stored therein. Additionally, the data storage service may update the metadata for the newly emptied data storage hosts within the data storage host grouping to specify that these data storage hosts do not include any data and may be used to fulfill any new data storage requests.

In this manner, a data storage service may consolidate data from a larger number of data storage hosts within a data storage host grouping to a smaller number of data storage hosts within the data storage host grouping. In addition, the techniques described and suggested herein facilitate additional technical advantages. For example, because, in some embodiments, the data storage service is configured to update the metadata for all data storage hosts within a data storage host grouping upon data consolidation, the newly emptied data storage hosts may no longer include metadata for any data stored therein. Additionally, because the consolidation of the data sets is performed in a manner that satisfies the redundancy encoding scheme, consolidation of the data sets to a fewer number of data storage hosts may have no impact on the durability of these data sets.

FIG. 1 shows an illustrative example of an environment 100 in which various embodiments can be implemented. In the environment 100, a data storage service may maintain a plurality of data storage host pairs 102, which each may comprise a number of data storage hosts 104 usable to provide data storage capacity for the customers of the data storage service. For instance, as will be described in greater detail below in connection with FIG. 3, when a customer of the data storage service provides a data object for storage, the data storage service may utilize a redundancy encoding scheme to divide the data object into smaller data fragments. An example of a process that a redundancy encoding engine may use is erasure coding. Through erasure coding, a data object consisting of various bits of information is reduced into smaller data fragments. Each data fragment may contain more than its proportional share of data such that the combination of data in all data fragments may be greater than that of the parent data object. Thus, not all data fragments are required to recompile the parent data object. While erasure coding is used extensively throughout the present disclosure for the purpose of illustration, the scope of the present disclosure is not necessarily limited to the processes explicitly noted herein. Further, it should be understood that a data storage service may be an object-based data storage service, a block-level data storage service, an archival data storage service or any other data storage service comprising the characteristics described throughout the present disclosure.

The data storage service may utilize the redundancy encoding engine to divide the data object into a number of data fragments equal to the number of data storage host pairs 102 available for data storage. For instance, the data storage service may select, at random, a data storage host 104 from each data storage host pair 102 for storage of a particular data fragment of the data object. Further, the data storage service may update the metadata for the selected data storage host 104 to specify that the data fragment is stored therein. By maintaining a plurality of data storage host pairs 102 comprising a plurality of data storage hosts 104, the data storage service may be able to utilize the redundancy encoding scheme to store data fragments within each data storage host pair 102. While data storage host pairs 102 are used extensively throughout the present disclosure for the purpose of illustration, data storage hosts 104 may be organized into groupings comprising a greater number of data storage hosts 104.

When the data object, stored as data fragments within the plurality of data storage host pairs 102, becomes obsolete, a customer may submit a request to the data storage service to request deletion of the data object. The data storage service, in response to the request, may access each data storage host pair 102 to identify the data storage host 104 within the data storage host pair 102 that includes the data fragment associated with the data object. Accordingly, the data storage service may delete the data fragment from the data storage host 104 and update the metadata to remove any reference to the data object. However, as the data storage hosts 104 are emptied over time, each data storage host 104 may include a disproportionate amount of data, leading to inefficiencies in data storage use.

In order to resolve such inefficiencies, the data storage service may be configured to evaluate each data storage host pair 102 to determine if the data storage capacity for the data storage host pair 102 reaches a particular emptiness threshold. For instance, the emptiness threshold may be defined as a point wherein a data storage host 104 within a particular data storage host pair 102 is capable of including a particular amount of data stored within the data storage host pair 102. Alternatively, the emptiness threshold may be defined as point wherein a subset of all data storage hosts 104 for a particular data storage host grouping is capable of storing the a particular amount of data for the grouping. If the defined emptiness threshold has been reached, the data storage service may begin the process of collapsing the identified data storage host pairs 102 to consolidate the particular amount of data into a single data storage host 104 or a subset of the data storage hosts 104 included within the grouping. The particular amount of data may include all data stored within the pair 102 or subset of this data, as defined by an administrator of the data storage service or other administrative entity. In an alternative embodiment, the data storage service introduces one or more new data storage hosts to the data storage host pair 102 that may be used to store the particular amount of data. The emptied data storage hosts may be removed from the host pair 102, such that the newly defined host pair 106 comprises these newly introduced one or more data storage hosts.

When the data storage service collapses the data storage host pair 102 to store the particular amount of data of the host pair 102 within a single data storage host 108, the data storage service may update the metadata for the data storage host 108 to specify that certain data fragments for the newly defined data storage host pair 106 are stored within this data storage host 108. Additionally, the data storage service may further update the metadata for the newly emptied data storage hosts to remove any data entries that may have been specified within prior to the consolidation of data. These newly emptied data storage hosts may now be available for other purposes, such as for providing available data storage capacity for new data storage requests. Further, the data storage service may be able to utilize these newly emptied data storage hosts to create new data storage host pairs 102 for data storage and enforcement of redundancy encoding schema.

Figure 2:
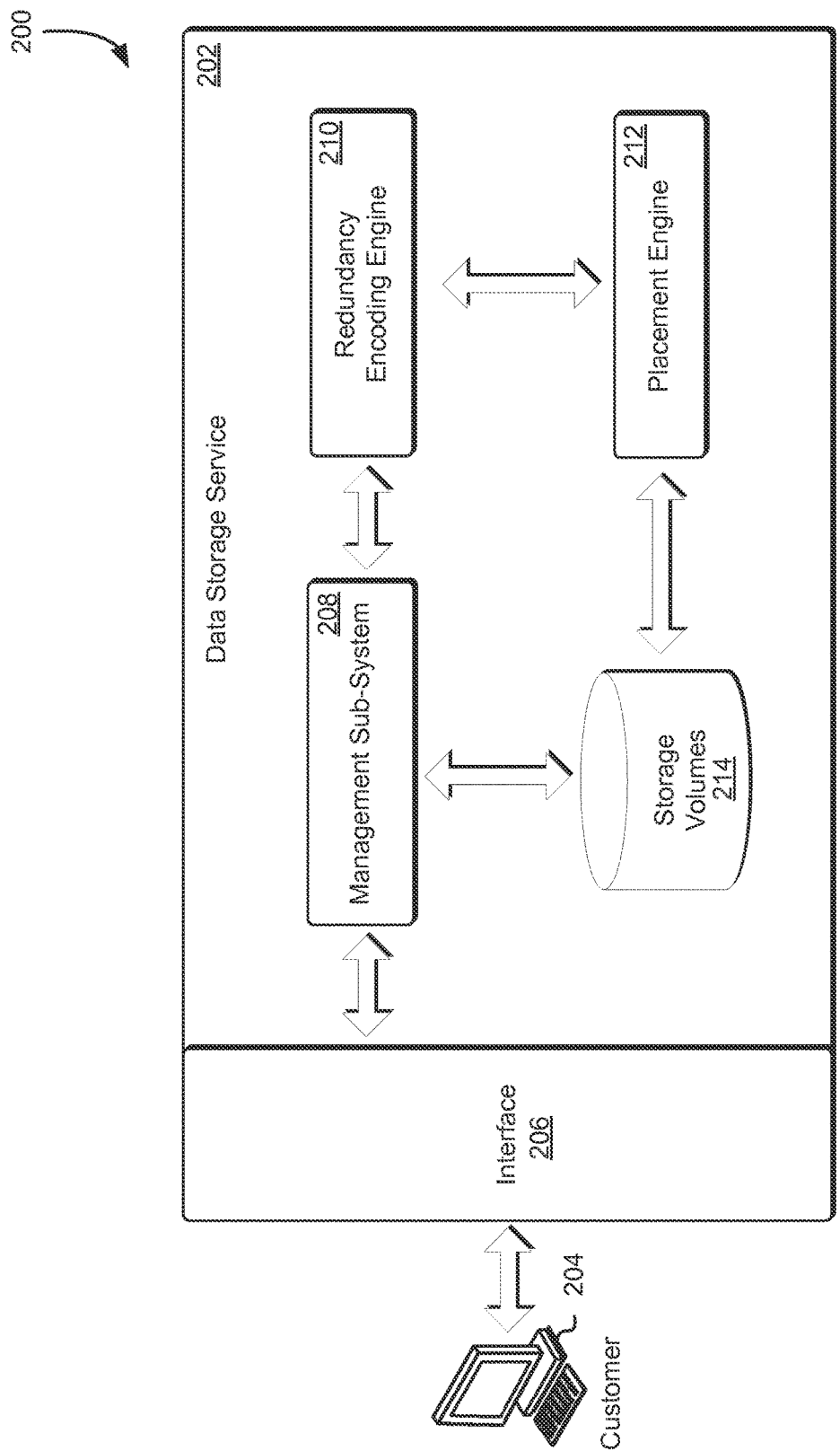
FIG. 2 shows an illustrative example of an environment in which various components of a data storage service are collectively configured to consolidate data storage hosts as these hosts are emptied in accordance with at least one embodiment.

As noted above, a customer may access a data storage service to request storage of one or more data objects or to request deletion of any stored data objects. These data objects may be stored by the data storage service according to one or more redundancy encoding schema, which may cause the data object to be reduced to smaller data fragments that may each be stored within a data storage host grouping. As customers remove their data objects from the data storage service, the data storage service may consolidate the data into a subset of data storage hosts within each grouping to enable newly emptied data storage hosts to be used for other purposes. Accordingly, FIG. 2 shows an illustrative example of an environment 200 in which various components of a data storage service 202 are collectively configured to consolidate data storage hosts as these hosts are emptied in accordance with at least one embodiment.

In the environment 200, the data storage service 202 may provide users with an interface 206 that may enable a customer 204, through his/her computing device, to access the data storage service 202. A customer 204 may utilize the interface 206 through one or more communications networks, such as the Internet. The interface 206 may contain certain security safeguards to ensure that the user has authorization to access the data storage service 202. For instance, in order to access the data storage service 202, a customer 204 may need to provide a username and a corresponding password or encryption key when using the interface 206. Additionally, requests (e.g., application programming interface (API) calls) submitted to the interface 206 may require an electronic signature generated using a cryptographic key such that the electronic signature is verifiable by the data storage service 202, such as by an authorization system (not shown).

Once the customer 204, through his/her computing device, has gained access to the data storage service 202 through the interface 206, the data storage service 202 may allow the customer 204 to interact, through the interface 206, with a management sub-system 208. For instance, the management sub-system 208 may enable the customer 204 to upload one or more data objects that may be stored within one or more data storage volumes 214 provided by the data storage service 202. These data storage volumes 214 may be a logical storage space within a data storage system in which data objects may be stored. A data storage volume 214 may be identified by a volume identifier. Data for a volume may reside in one physical storage device (e.g., a hard disk) or span across multiple storage devices. In the latter case, a volume comprises volume components each residing on a different storage device. In some examples, a data storage host may be a portion of a volume that is physically stored in a storage entity such as a storage device. Data storage hosts for the same volume may be stored on different storage entities. In one case, when data is encoded by a redundancy encoding scheme (e.g., erasure coding scheme, redundant array of inexpensive disks (RAID), replication), each encoded data fragment may be stored in a different data storage host pair or grouping to provide fault tolerance, isolation, and data durability (e.g., only a portion of all data fragments are required to recompile the parent data object). In some cases, a data storage host and/or data storage host pair/grouping is identified by an identifier that includes a volume identifier and a data fragment slot identifier.

When a customer 204 provides, through the interface 206, one or more data objects for storage within the data storage service 202, the management sub-system 208 may process the received one or more data objects using a redundancy encoding engine 210. The redundancy encoding engine 210 may utilize a redundancy encoding scheme to divide the data object into smaller data fragments. An example of a process that a redundancy encoding engine 210 may use is erasure coding. As noted above, through erasure coding, a data object consisting of various bits of information is reduced into smaller data fragments. Each data fragment may contain more than its proportional share of data such that the combination of data in all data fragments may be greater than that of the parent data object. Thus, not all data fragments are required to recompile the parent data object. Other redundancy encoding schemes may be used in addition to or as an alternative to erasure coding. For instance, other redundancy encoding schemes that may be used include RAID and replication.

In various embodiments, the data storage service 202 includes a placement engine 212. The placement engine 212, as illustrated here, may be a computer system or component of a computer system that is configured to apply a set of rules to place data fragments into various data storage volumes 214 within the data storage system. Generally, data storage volumes 214 within a data storage system may have corresponding physical characteristics. For instance, a volume 214 may be defined as a particular storage device, a particular multiple storage device unit (e.g., JBOD), a particular data storage system rack, a particular data center room, a particular data center or a particular data center geographical location. Additionally, a volume 214 may be defined within a storage device. For example, a volume 214 may be defined as a particular platter within a storage device or multiple storage devices, a particular side of the platter, a particular region of the platter (e.g., inner annular region or outer annular region), a particular region within a storage device accessible by a certain head, or a particular cache in the case of a hybrid storage device.

The data storage volumes 214 may be redundancy encoded into one or more smaller data storage hosts wherein the data fragments may be stored. These data storage hosts may be organized into one or more data storage host groupings. Each data storage host grouping may comprise two or more data storage hosts wherein the data fragments may be stored. For instance, in an embodiment, the placement engine 212 may obtain the one or more data fragments from the redundancy encoding engine 210 and select a data storage host from each data storage host grouping to store a data fragment. As the data fragment is stored within each storage host, the placement engine 212 may update the metadata for each of these storage hosts to specify the location of the data fragment within the data storage host. In an embodiment, the placement engine 212 distributes the plurality of data fragments among a plurality of data storage host groupings such that consolidation of data of a data storage host grouping to fewer data storage hosts maintains compliance with one or more conditions for independent failure of the plurality of data fragments of the plurality of data objects such that these one or more conditions are not violated. For example, a condition for independent failure of the plurality of data fragments of the plurality of data objects may be that the durability of the data objects are to remain the same upon consolidation. Alternatively, the condition for independent failure of the plurality of data fragments of the plurality of data objects may be that the durability of the data objects may be reduced only by a certain amount, such that the effect of the reduction is minimal. As an example, a condition for independent failure of the plurality of data fragments of the plurality of data objects may be that N storage hosts need to irrecoverably fail (i.e., that data fragments on the data storage host cannot be obtained) before a data object becomes at least irrecoverable.

As customers 204 submit one or more requests, through the interface 206, to the management sub-system 208 to delete their stored data from the one or more data storage volumes 214, the management sub-system 208 may access these data storage volumes 214 to determine the available storage capacity for each of the data storage host groupings within each data storage volume 214. For instance, for each data storage host grouping, the management sub-system 208 may evaluate each data storage host within the grouping to determine the used data storage capacity for the data storage host. Based at least in part on the aggregate used capacity for the data storage host grouping, the management sub-system 208 may determine whether an emptiness threshold has been reached. As noted above, an emptiness threshold may be defined as a point wherein a data storage host within a particular data storage host pair is capable of including a particular amount of data stored within the data storage host pair, as defined by an administrator of the data storage service 202 or other administrative entity (e.g., a network management service, a computing resource service provider, etc.). Alternatively, the emptiness threshold may be defined as point wherein a subset of all data storage hosts for a particular data storage host grouping is capable of storing a particular amount of the data collection for the grouping.

If the emptiness threshold has been reached for a particular data storage host grouping, the management sub-system 208 may collapse the data storage host grouping by transferring the particular amount of data to the selected subset of data storage hosts of the grouping. Additionally, the management sub-system 208 may update the metadata in each of the data storage hosts to either specify that no data is stored therein or that the recently added data is now stored therein. In some embodiments, the management sub-system 208 may remove the newly emptied data storage hosts from the data storage host grouping and use it for other purposes. For instance, the management sub-system 208 may create new data storage host groupings comprising newly emptied data storage hosts and make these available to customers 204 of the data storage service 202. In other embodiments, the management sub-system 208 may keep the one or more newly emptied data storage hosts within their original data storage host groupings for storage of newly received data.

As noted above, a data storage service may utilize a redundancy encoding engine, which may be used to divide a data object received from a customer into smaller data fragments according to one or more redundancy encoding schemes. These smaller data fragments may each be stored in a data storage host pair/grouping to minimize or otherwise constrain the possible effects on data durability due to data storage host failures before and after consolidation of data within the data storage host pair/grouping (simply referred to as a "grouping."). For example, the data may be redundantly encoded to a M:N encoding scheme where there are N total data fragments and any subset of M data fragments is sufficient to reconstruct the data while any subset of less than M data fragments is insufficient to reconstruct the data. (Note that M is less than or equal to N and that M and N are integers). The data fragments may be stored to avoid the possibility of correlated losses of data fragments of the same data object due to data storage host failures, even after consolidation of data onto fewer data storage hosts in a grouping. For example, one data fragment may be stored in a grouping such that, no matter how much consolidation occurs in the grouping, a failure of a data storage host in the grouping will cause a loss of at most one data fragment. Thus, in an M:N encoding scheme with M less than N, the loss of a data storage host will still leave N−1 data fragments of the data object, enabling recovery of the data object by locating M of the N−1 data fragments remaining. Of course, the techniques described herein are generalizable to allocating data fragments to set constraints on the possibility of correlated losses of data fragments of the same data object after consolidation of data fragments to fewer data storage hosts in a grouping. For instance, in some examples, data may be allocated among data storage host groupings so that a loss of a data storage host, even after consolidation of data to fewer data storage hosts in the data storage host's grouping, results in at most a loss of K data fragments, where K is an integer.

Figure 3:
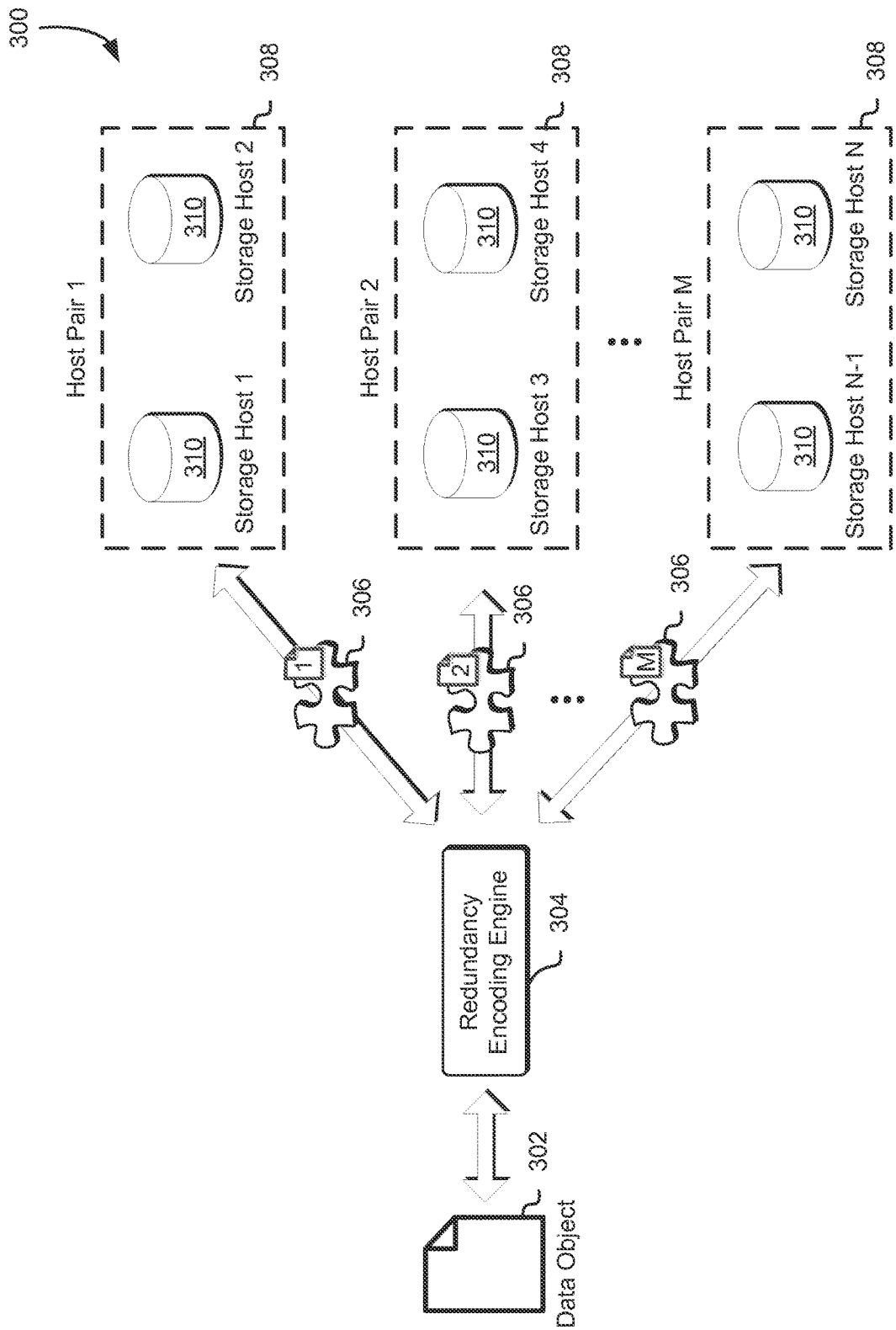
FIG. 3 shows an illustrative example of an environment in which one or more data objects are reduced into one or more data fragments and stored within a plurality of data storage host pairs in accordance with at least one embodiment.

FIG. 3 shows an illustrative example of an environment 300 in which one or more data objects 302 are reduced into one or more data fragments 306 and stored within a plurality of data storage host pairs 308 in accordance with at least one embodiment. In the environment 300, a customer transmits a data object 302 (e.g., this may include files composed of one or more bits such as, but not limited to, executable programs, drawings and text documents) to a data storage service for storage in a data storage system (e.g., data storage volumes, etc.).

The data object 302 is processed through a redundancy encoding engine 304. The redundancy encoding engine 304 may utilize one or more algorithms to convert the data object provided by the customer into numerous data fragments 306. The data storage system may maintain a database that associates an identifier of the parent data object 302 with the data storage locations of the data fragments 306. Additionally, the data fragments 306 may be encoded for tracking within the system. For example, a data fragment 306 may be encoded with the name of the parent data object 302 and the number of fragments required to recompile the data object 302 at a later time.

Subsequently, the data storage service, through a placement engine, may determine the location for each data fragment 306 in the data storage system. A placement engine may be a computer system or component of a computer system that is configured to apply a set of rules to place data fragments 306 into storage devices (e.g., drives) in the data storage system. The placement engine may use a variety of rules specified by the service provider to determine proper location. Rules may be configured to enforce conditions for heterogeneity for the fragments 306 among one or more physical characteristics. For instance, a rule may prohibit the placement of two or more data fragments in the same data storage host pair or grouping 308. Thus, for example, a rule that may be included in the placement engine methodology is one that may store each data fragment 306 within a randomly selected data storage host 310 of each data storage host pair/grouping 308.

Additional rules may also be more complex in nature. For instance, a rule may include allowing only k of n data fragments to share the same probability of loss or corruption, where k and n are positive integers. Thus, n−k (n minus k) data fragments may need to have a lower probability of loss or corruption, possibly ensuring recoverability of the parent data object. Another example of a more complex rule is one that may prohibit k of n fragments from being stored on the same platter, but on different storage devices or hosts 310. For instance, the rule may state that only two fragments can be stored on platter No. 2 of any storage host 310. Thus, storing one fragment on platter No. 2 of storage host 1, one fragment on platter No. 2 of storage host 3, and one fragment on platter No. 2 of storage host N would violate the rule. Accordingly, the placement engine may place the data fragments 306 into the corresponding storage hosts 310 for each data storage host pair/grouping 308. Additionally, the placement engine may update metadata associated with each of the selected data storage hosts 310 to specify additional information relating to the parent data object and the location of each data fragment 306 in the storage hosts 310. If a customer requests access to a data object through the data storage service, the metadata may serve as a directory for the relevant information necessary to obtain such access.

Figure 4:
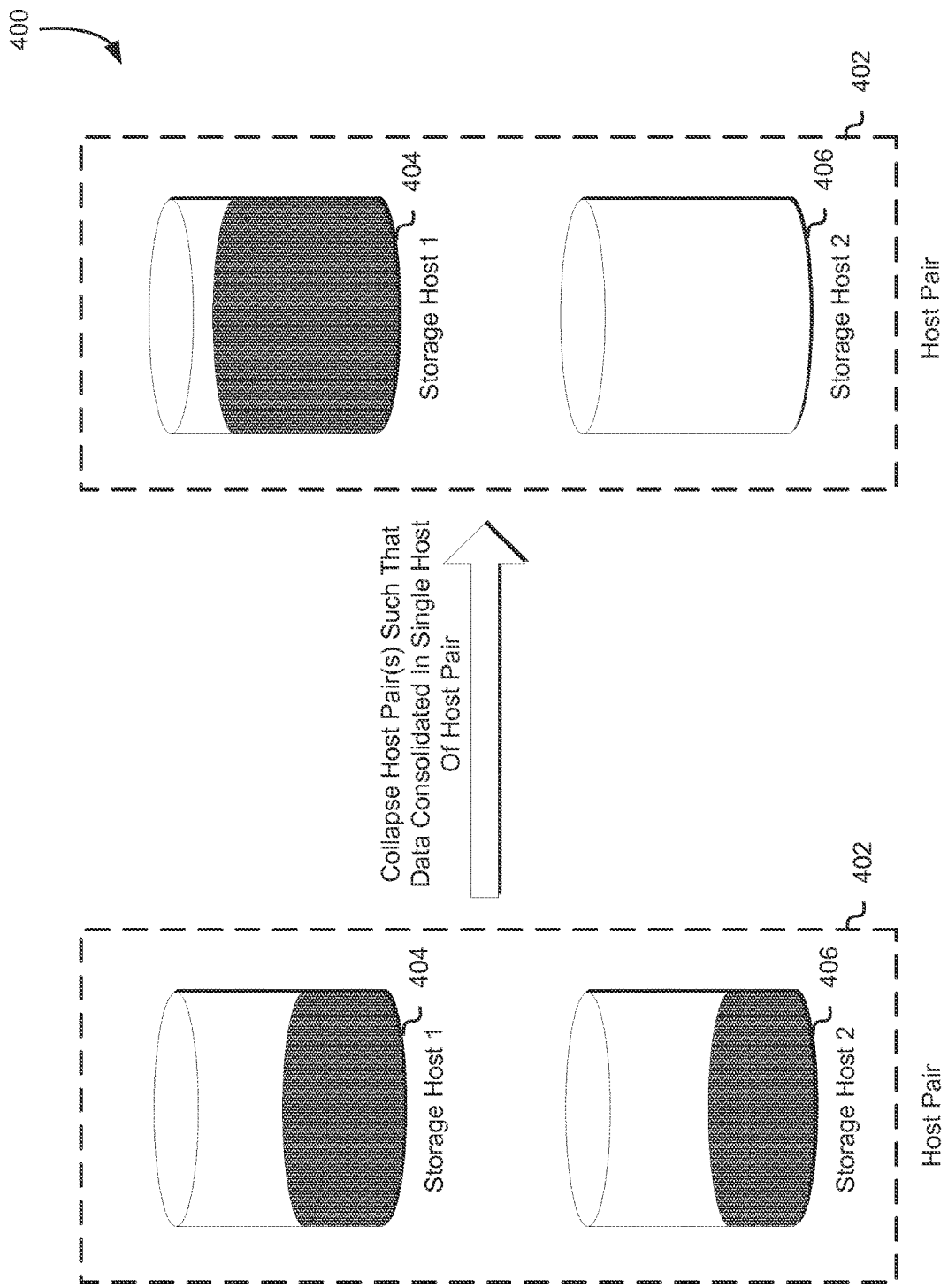
FIG. 4 shows an illustrative example of an environment in which data stored within a plurality of data storage hosts within a data storage host pair is consolidated into a single data storage host in accordance with at least one embodiment.

As noted above, a data storage service may be configured to evaluate each data storage host pair/grouping to determine whether the data storage host pair/grouping has reached a particular emptiness threshold. If the data storage pair/grouping has reached this particular emptiness threshold, the data storage service may collapse the host pair/grouping by consolidating the data stored therein into a subset of data storage hosts of the pair/grouping. Accordingly, FIG. 4 shows an illustrative example of an environment 400 in which data stored within a plurality of data storage hosts 404, 406 within a data storage host pair 402 is consolidated into a single data storage host 404 in accordance with at least one embodiment.

In the environment 400, a particular data storage host pair 402 may include a first data storage host 404 and a second data storage host 406. As data is deleted from each of these data storage hosts 404, 406, the first data storage host 404 and the second data storage host 406 may include varying amounts of data therein. Additionally, the metadata overhead cost for each of the data storage hosts 404, 406 may increase as the amount of data stored within is reduced over time. The data storage service may evaluate the data storage hosts 404, 406 within the data storage host pair 402 to determine whether an emptiness threshold has been reached for consolidation of the collective data stored therein. While data storage host pairs, comprising two data storage hosts, are used extensively throughout the present disclosure for the purpose of illustration, other data storage host groupings may be created by the data storage service. Each of these data storage host groupings may include two or more data storage hosts.

If the data storage service determines that the emptiness threshold for the data storage host pair 402 has been reached, the data storage service may transmit one or more requests to a placement engine to consolidate the data into an identified data storage host 404 capable of storing a particular amount of data for the data storage host pair 402. For instance, if the data storage host pair 402 includes two data storage hosts 404, 406, the emptiness threshold may be defined as a point wherein one of the two data storage hosts 404, 406 may be able to store the particular amount of data for the data storage host pair 402. For larger data storage host groupings comprising more than two data storage hosts, the emptiness threshold may be defined as a point wherein a subset of the total data storage hosts may store the particular amount of data for the data storage host grouping.

In some embodiments, the data storage service may select, for consolidation of data within a particular data storage host pair 402, a data storage host at random that will include the particular amount of data for the data storage host pair 402. Alternatively, the data storage service may select the data storage host comprising the greatest volume of data within the data storage host pair 402 for storing the particular amount of data of the data storage host pair 402. Selection of the host comprising the greatest volume of data may result in fewer metadata modifications upon consolidation of data. Other criteria may be used to determine which data storage host of the data storage host pair 402 may be used to store the particular amount of data. For instance, the data storage service may evaluate the age of data stored within each of the data storage hosts within the data storage host pair 402 and determine which data storage host, upon consolidation, would include data that has similar ages. Alternatively, the data storage service may utilize rules configured to enforce conditions for heterogeneity for the fragments among one or more physical characteristics to determine which data storage host may be used for data consolidation. In some embodiments, the data storage service may calculate a score for each data storage host of the data storage host pair 402 that may be used to select the data storage host for consolidation. For instance, the score may be determined utilizing the rules described above as well as other factors, such as the age of data within each host. Using the example illustrated in FIG. 4, the first data storage host 404 may include a greater volume of data than the second data storage host 406 of the data storage host pair 402. The data storage service may determine that the data storage host pair 402 has reached the emptiness threshold and select the first data storage host 404 for storing the particular amount of data of the host pair 402.

Once the data storage service has selected the first data storage host 404 for data consolidation, the data storage service may transmit a request to the placement engine, such as through one or more API calls to the engine, to collapse the data storage host pair 402 by consolidating the data therein on to the first data storage host 404. In response to the request, the placement engine may transfer all data from the second data storage host 406 to the first data storage host 404. Additionally, the placement engine may update the metadata for each data storage host 404, 406 to specify the location of data stored therein. Thus, the metadata for the second data storage host 406 may not include any information, as this data storage host 406 may no longer include any data. The data storage service may utilize the now emptied data storage host 406 to store any new data fragments associated with data objects received from one or more customers of the data storage service. Additionally, or alternatively, the data storage service may remove the newly emptied data storage host 406 from the data storage host pair 402 and, with other emptied data storage hosts, create new data storage host pairs or groupings that may be used to store newly supplied data fragments.

Figure 5:
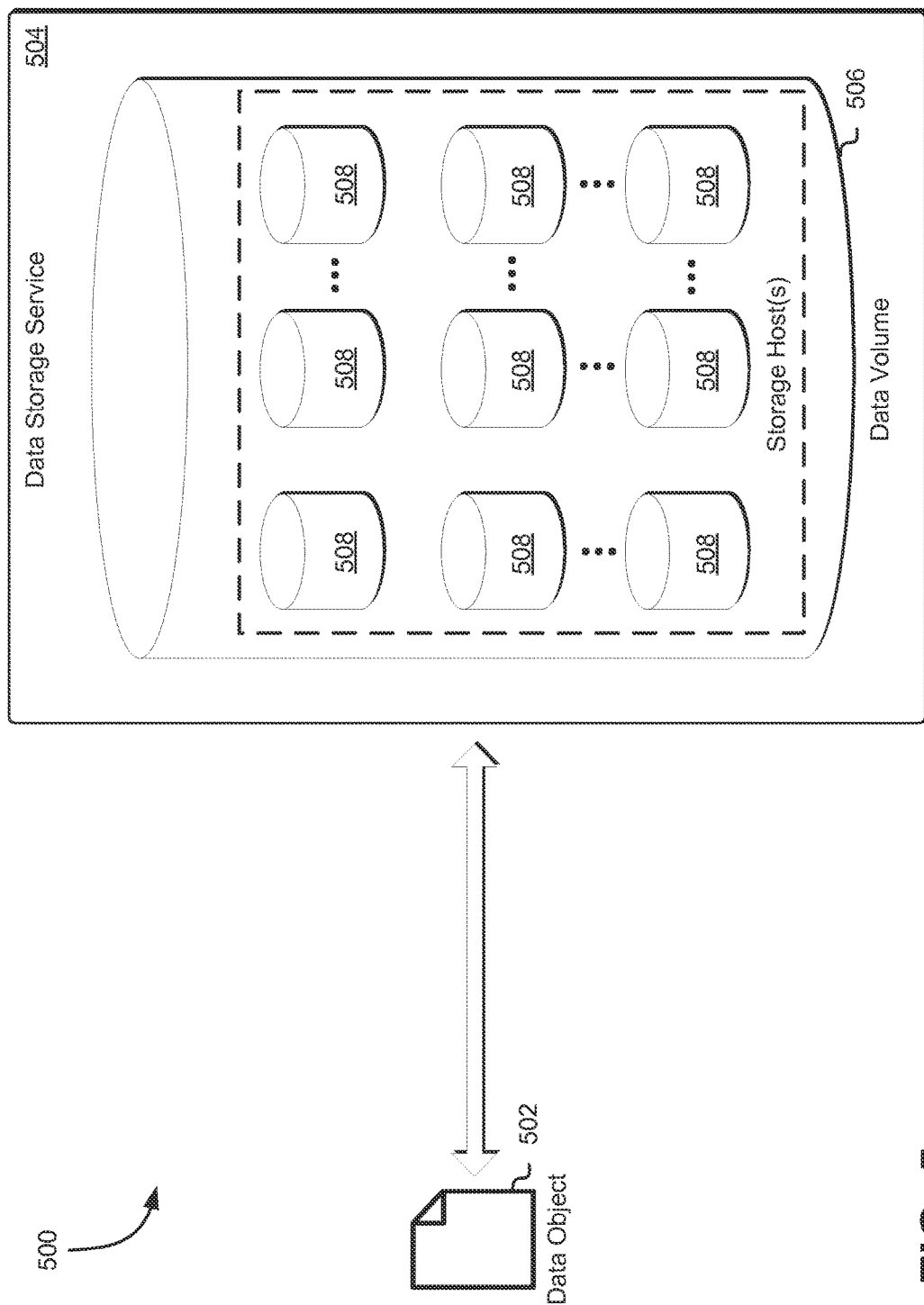
FIG. 5 shows an illustrative example of an environment in which a data object is stored within one or more data storage hosts of a data storage service in accordance with at least one embodiment.

As noted above, a data storage service may maintain one or more data storage volumes for storing data objects provided by one or more customers of the data storage service. Each of these one or more data storage volumes may include a plurality of data storage hosts, which may be redundancy encoded to reduce the risk of data loss in the event of a catastrophic failure of one or more of these data storage hosts. Further, these data storage hosts may be organized into one or more data storage host pairs or groupings to minimize or otherwise constrain the possible effects on data durability due to data storage host failures before and after consolidation of data within the data storage host groupings. Accordingly, FIG. 5 shows an illustrative example of an environment 500 in which a data object 502 is stored within one or more data storage hosts 508 of a data storage service 504 in accordance with at least one embodiment.

In the environment 500, a data object 502 may be stored within a data storage service 504 having at least one data storage volume 506 partitioned into a plurality of data storage hosts 508 for storing data fragments of the data object 502 within these data storage hosts 508. For instance, as noted above, the data object 502 may be processed through a redundancy encoding engine. The redundancy encoding engine may utilize one or more algorithms to convert the data object 502 provided by the customer into numerous data fragments. The data storage service 504 may maintain a database that associates an identifier of the parent data object 502 with the data storage locations of the data fragments. Additionally, the data fragments may be encoded for tracking within the data storage volume 506. For example, a data fragment may be encoded with the name of the parent data object 502 and the number of fragments required to recompile the data object at a later time.

In order to minimize the possible effects on data durability due to data storage host failures before and after consolidation, the plurality of data storage hosts 508 within a data storage volume 506 may be organized into one or more data storage host pairs or groupings. Each data storage host pair or grouping may comprise two or more data storage hosts 508 of the plurality of data storage hosts 508 for fulfillment of the redundancy encoding scheme. For instance, the data storage service 504 may record, within metadata for each data storage host 508, an identifier specifying the data storage host grouping the data storage host 508 is a part of. Further, the data storage service 504 may configure a redundancy encoding engine to convert the data object 502 to a number of data fragments equal to the number of data storage host pairs or groupings. Once the data object 502 has been converted to the appropriate number of data fragments, a placement engine of the data storage service 504 may store each data fragment within a unique data storage host pair or grouping, such that each data storage host pair or grouping includes a single data fragment for storage. Additionally, the placement engine may select, from each data storage host pair or grouping, one data storage host which may be used to store the data fragment for the pair or grouping. The selected data storage host 508 may be selected at random or based at least in part on one or more criteria (e.g., available storage capacity, number of distinct data fragments stored within, etc.). The placement engine may update the metadata for the selected data storage host 508 to specify the location of the data fragment within the data storage host 508.

When a customer requests deletion of the data object 502 from the data storage service 504, the data storage service 504 may identify which one or more data storage hosts 508 comprise the plurality of data fragments associated with the data object 502 and delete these data fragments from these one or more data storage hosts 508. As the data storage hosts 508 continue emptying over time, the data storage service 504 may evaluate each data storage host pair or grouping to determine if the pair or grouping has reached a particular emptiness threshold. If the data storage service 504 determines that the emptiness threshold has been reached for one or more data storage host pairs or groupings, the data storage service 504 may cause the placement engine to collapse these one or more data storage host pairs or groupings such that only a subset of the data storage hosts 508 within each of these one or more data storage host pairs or groupings include a particular amount of data for the data storage host pair or grouping. The placement engine may subsequently update the metadata for each of the affected data storage hosts 508 to specify the location of the data fragments stored within the data storage host 508. The data storage service 504 may make the newly emptied data storage hosts 508 available for storage of new data objects and, in some embodiments, may create new data storage host pairs or groupings comprising these newly emptied data storage hosts 508.

Figure 6:
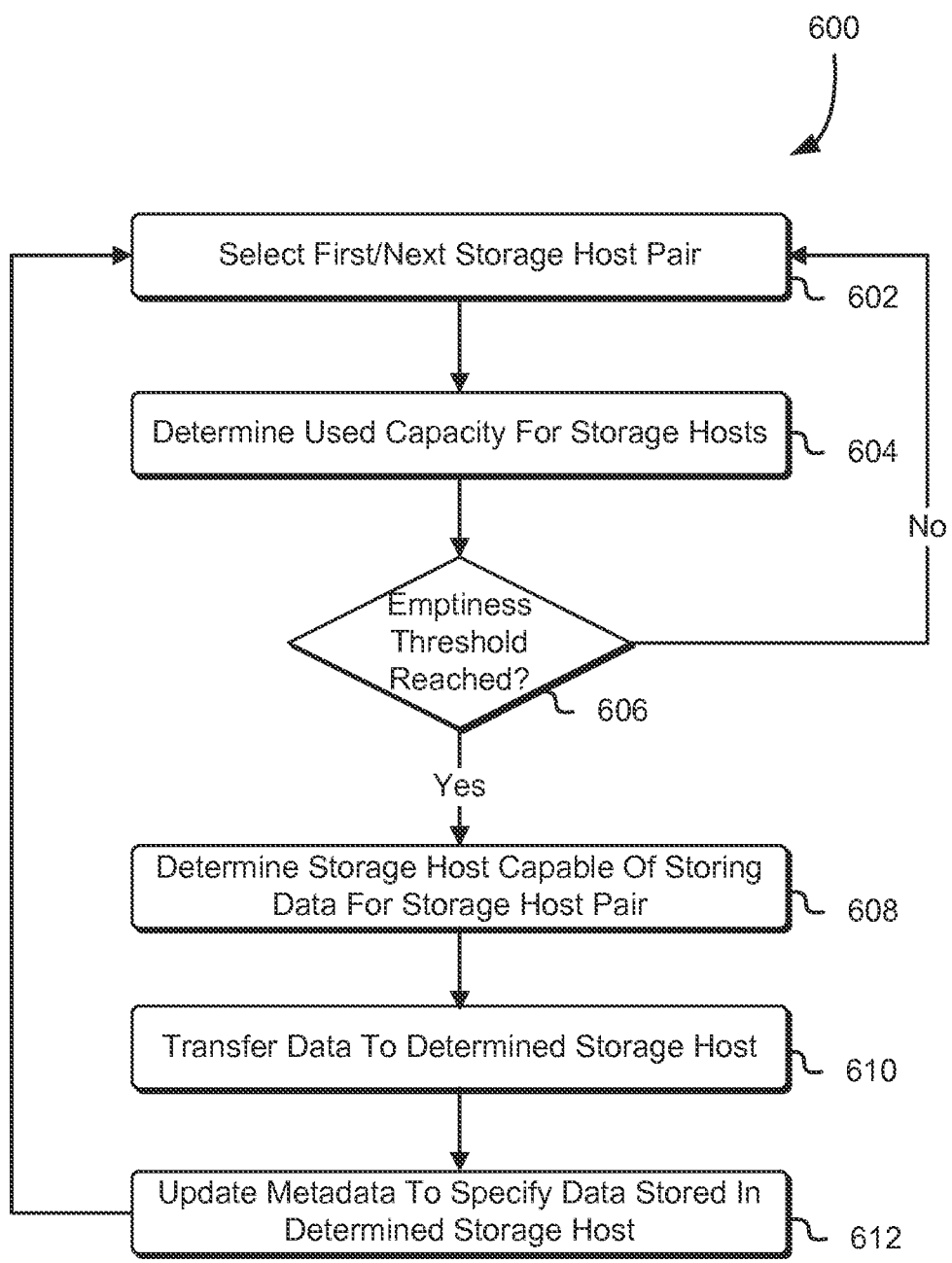
FIG. 6 shows an illustrative example of a process for consolidating data storage host pairs in accordance with at least one embodiment.

As noted above, a data storage service may be configured to evaluate one or more data storage host pairs to identify any host pairs that may be collapsed such that the collective data for the storage host pair is stored within a single data storage host. Accordingly, FIG. 6 shows an illustrative example of a process 600 for consolidating data storage host pairs in accordance with at least one embodiment. The process 600 may be performed by the aforementioned data storage service, which may include a placement engine usable for consolidating data within a data storage host pair and updating metadata associated with each data storage host of the host pair. Further, the data storage service may be configured to evaluate each of the data storage hosts to identify available data capacity.

The process 600 may be performed in response to a triggering event (e.g., a certain number of customer delete requests received over a particular period of time) or after a specified period of time. In an embodiment, in response to the triggering event or after the specified period of time has elapsed, the data storage service evaluates a plurality of data storage host pairs to determine whether collapse of any of these data storage host pairs should be performed. Thus, the data storage service may select 602 a first data storage host pair of the plurality of data storage host pairs to determine whether this data storage host pair may be collapsed. Each data storage host pair may comprise two data storage hosts, each configured to store one or more data fragments corresponding to one or more data objects provided by customers of the data storage service for storage. It should be noted that in some embodiments, as customers submit delete requests, the data storage service may immediately reuse the newly available capacity for data fragments from other data storage hosts or for other data. Thus, in such embodiments, determination of whether collapse of any of these data storage host pairs should be performed may be made after the newly available capacity has been reused.

Once the data storage service has selected a first data storage host pair from the plurality of data storage host pairs, the data storage service may determine 604 the used storage capacity for each of the data storage hosts included within the selected data storage host pair. Based at least in part on the used capacity for each data storage host of the data storage host pair, the data storage service may determine 606 whether a particular emptiness threshold has been reached for the selected data storage host pair. For instance, as noted above, the emptiness threshold may be defined as a point wherein one of the two data storage hosts may be able to store a particular amount of data for the data storage host pair. Alternatively, the emptiness threshold may be defined as a point wherein the metadata overhead cost exceeds the cost, per byte, for storage of customer data fragments within the data storage hosts of the data storage host pair. Thus, in order to determine 604 whether a particular emptiness threshold has been reached for the selected data storage host pair, the data storage service may compare the available capacity remaining within the data storage hosts of the host pair to an emptiness threshold metric (e.g., maximum available capacity for consolidation).

If the emptiness threshold has not been reached, the data storage service may select 602 a next data storage host pair for analysis. However, if the emptiness threshold has been reached, the data storage service may determine 608 which data storage host of the host pair is capable of storing the particular amount of data for the data storage host pair. For instance, the data storage service may select a data storage host from the pair at random, since both may be capable of storing the collective data for the host pair. Alternatively, the data storage service may select the data storage host comprising the greatest amount of data, as the resource cost (e.g., time, expense) of writing additional data entries within the metadata for the particular data storage host may be lower than if the data was transferred to the lightly loaded data storage host from the host comprising the greatest amount of data. As noted above, the data storage service may alternatively or additionally utilize other criteria may be used to determine which data storage host of the data storage host pair may be used to store the particular amount of data. For instance, the data storage service may evaluate the age of data stored within each of the data storage hosts within the data storage host pair and determine which data storage host, upon consolidation, would include data that has similar ages. Alternatively, the data storage service may utilize rules configured to enforce conditions for heterogeneity for the fragments among one or more physical characteristics to determine which data storage host may be used for data consolidation.

Once the data storage service has determined which data storage host will store the particular amount of data of the host pair, the data storage service, through a placement engine, may transfer 610 the data from the other data storage host to the determined data storage host. Additionally, the placement engine may update 612 the metadata of the determined data storage host to specify the additional data now stored within this data storage host. This may enable the data storage service, in response to customer requests for data objects, to locate an associated data fragment stored within the data storage host pair. The data storage service may also make the newly emptied data storage host of the host pair available for storage of data fragments associated with new data objects. Alternatively, the data storage service may remove the newly emptied data storage host from the host pair and generate new data storage host pairs comprising newly emptied data storage hosts. Upon completion of the one or more tasks associated with the selected data storage host pair, the data storage service may select 602 a next data storage host pair for analysis.

Figure 7:
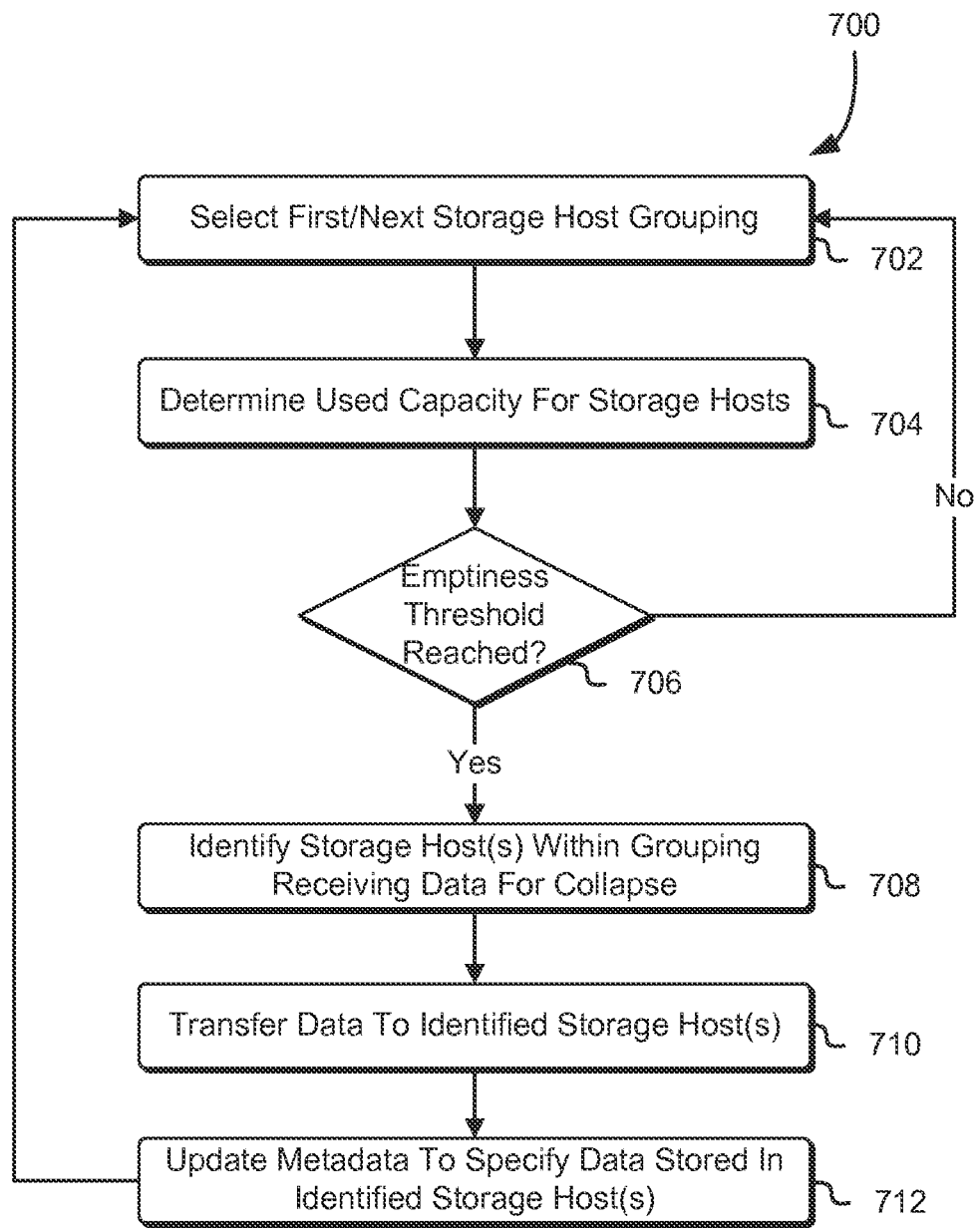
FIG. 7 shows an illustrative example of a process for consolidating data storage host groupings comprising more than two data storage hosts in accordance with at least one embodiment.

As noted above, the data storage service may be configured to organize a plurality of data storage hosts into one or more data storage host groupings. These data storage host groupings, as opposed to the data storage host pairs described above, may comprise three or more data storage hosts. Similar to the process 600 described above, the data storage service may be configured to evaluate one or more data storage host groupings to identify any host groupings that may be collapsed such that the collective data for the storage host pair is stored within a subset of the data storage hosts included within the data storage host grouping. Accordingly, FIG. 7 shows an illustrative example of a process 700 for consolidating data storage host groupings comprising more than two data storage hosts in accordance with at least one embodiment. The process 700 may be performed by the aforementioned data storage service which may include a placement engine usable for consolidating data within a data storage host grouping and updating metadata associated with each data storage host of the host grouping. Further, the data storage service may be configured to evaluate each of the data storage hosts to identify available data capacity. The process 700 may be performed using similar steps as the process 600 described above in connection with FIG. 6. For instance, the process 700 may be performed in response to a triggering event (e.g., a certain number of customer delete requests received over a particular period of time) or after a specified period of time.

In an embodiment, in response to the triggering event or after the specified period of time has elapsed, the data storage service evaluates a plurality of data storage host groupings to determine whether collapse of any of these data storage host groupings should be performed. Thus, the data storage service may select 702 a first data storage host grouping of the plurality of data storage host groupings to determine whether this data storage host grouping may be collapsed. Each data storage host grouping may comprise three or more data storage hosts, each configured to store one or more data fragments corresponding to one or more data objects provided by customers of the data storage service for storage.

Similar to the process 600 described above, the data storage service may determine 704 the used storage capacity for each of the data storage hosts included within the selected data storage host grouping. Based at least in part on the used capacity for each data storage host of the data storage host grouping, the data storage service may determine 706 whether a particular emptiness threshold has been reached for the selected data storage host grouping. For instance, the data storage service may obtain the sum of the amount of used capacity for each data storage host and compare this sum to an emptiness threshold metric (e.g., maximum available capacity for consolidation). Further, the data storage service may determine whether a determined subset of data storage hosts for the data storage host grouping are capable of storing a particular amount of data for the entire data storage host grouping. If the data storage service determines that the emptiness threshold has not been reached or that the defined subset of the data storage hosts of the grouping is not capable of storing the particular amount of data for the data storage host grouping, the data storage service may select 702 a next data storage host grouping for analysis.

If the data storage service determines that the emptiness threshold for the selected data storage host grouping has been reached, the data storage service may identify 708 the one or more data storage hosts within the data storage host grouping that may be used to store the particular amount of data for the entire data storage host grouping, enabling collapse of the grouping. For instance, the data storage service may select a subset of data storage hosts from the grouping at random, since the subset of data storage hosts may be capable of storing the collective data for the host grouping. Alternatively, the data storage service may select a subset of the data storage hosts comprising the greatest amount of data, as the resource cost (e.g., time, expense) of writing additional data entries within the metadata for the particular subset of data storage hosts may be lower than if the data was transferred to the lightly loaded data storage hosts from the hosts comprising the greatest amount of data. The data storage service may also utilize other criteria to determine the one or more data storage hosts of the data storage host grouping that may be used to store the particular amount of data. For instance, the data storage service may evaluate the age of data stored within each of the data storage hosts within the data storage host grouping and determine which data storage hosts, upon consolidation, would include data that has similar ages. Alternatively, the data storage service may utilize rules configured to enforce conditions for heterogeneity for the fragments among one or more physical characteristics to determine which one or more data storage hosts may be used for data consolidation.

Once the data storage service has determined which one or more data storage hosts will store the collective data of the host grouping, the data storage service, through a placement engine, may transfer 710 the data from the other data storage hosts to the determined one or more data storage hosts of the grouping. Additionally, the placement engine may update 712 the metadata of the identified one or more data storage hosts to specify the additional data now stored within these one or more data storage hosts. Upon completion of the one or more tasks associated with the selected data storage host grouping, the data storage service may select 702 a next data storage host grouping for analysis and consolidation.

Figure 8:
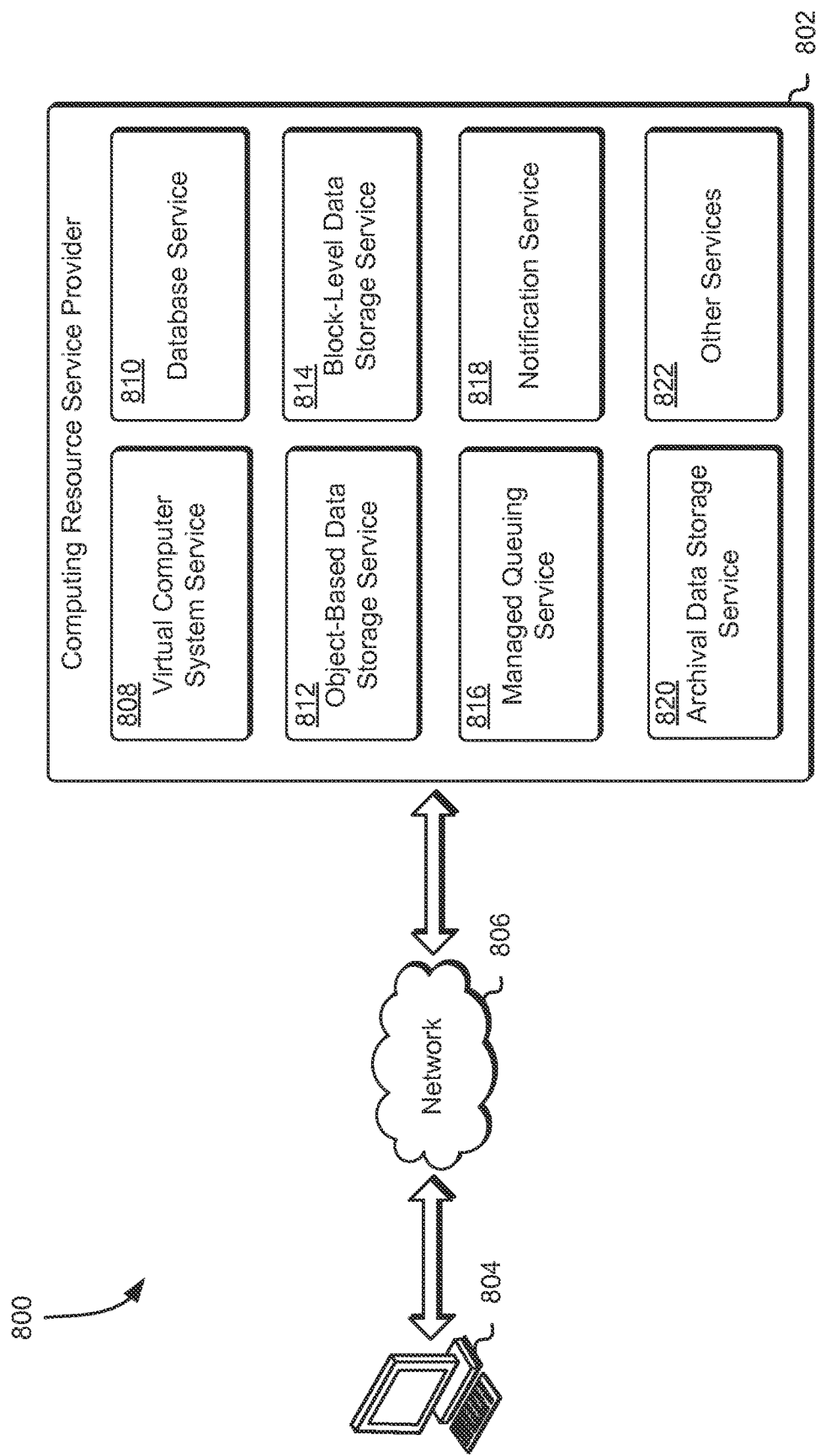
FIG. 8 shows an illustrative example of an environment in which various embodiments can be implemented.

FIG. 8 shows an illustrative example of an environment 800 in which various embodiments can be implemented. In the environment 800, a computing resource service provider 802 may provide a variety of services to a customer 804 or other users. The customer 804 may be an organization that may utilize the various services provided by the computing resource service provider 802 to remotely generate and maintain one or more resources and provide a mapping of user roles for use within a customer network to enable management of one or more delegated access permissions to define a level of access for users of his or her resources. As illustrated in FIG. 8, the customer 804 may communicate with the computing resource service provider 802 through one or more communications networks 806, such as the Internet. Some communications from the customer 804 to the computing resource service provider 802 may cause the computing resource service provider 802 to operate in accordance with various techniques described herein or variations thereof.

As noted above, a computing resource service provider 802 may provide various computing resource services to its customers. For instance, in this particular illustrative example, the computing resource service provider 802 provides at least seven types of services. The services provided by the computing resource service provider, in this example, include a virtual computer system service 808, a database service 810, an object-based data storage service 812, a block-level data storage service 814, a managed queuing service 816, a notification service 818, an archival data storage service 820 and one or more other services 822, although not all embodiments of the present disclosure will include all such services and additional services may be provided in addition to or as an alternative to services explicitly described herein.

The virtual computer system service 808 may be a collection of computing resources configured to instantiate virtual machine instances onto virtual computer systems on behalf of the customers 804 of the computing resource service provider 802. Customers 804 of the computing resource service provider 802 may interact with the virtual computer system service 808 to provision and operate virtual computer systems that are instantiated on physical computing devices hosted (e.g., physical hosts) and operated by the computing resource service provider 802. The virtual computer systems may be used for various purposes, such as to operate as servers supporting a website. Other applications for the virtual computer systems may be to support database applications, electronic commerce applications, business applications and/or other applications.

The object-based data storage service 812 may comprise a collection of computing resources that collectively operate to store data for a customer 804. The data stored in the data storage service 812 may be organized into data objects. The data objects may have arbitrary sizes except, perhaps, for certain constraints on size. Thus, the object-based data storage service 812 may store numerous data objects of varying sizes. The object-based data storage service 812 may operate as a key value store that associates data objects with identifiers of the data objects which may be used by the customer to retrieve or perform other operations in connection with the data objects stored by the object-based data storage service 812. Access to the object-based data storage service 812 may be through appropriately configured API calls.

The block-level data storage service 814 may comprise a collection of computing resources that collectively operate to store data for a customer. For instance, the block-level data storage system may be configured to provide block-level data storage volumes for use with a virtual machine instance, as noted above. A customer may interact with the block-level data storage service 814 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The managed queuing service 816 may be a collection of computing resources configured to enable customers 804 to store one or more messages in queues for use by one or more services provided by the computing resource service provider 802. Each message that is stored in a queue may comprise one or more appropriately configured API calls which, when processed by the recipient service, may cause the service to perform one or more actions. Alternatively, each message may comprise any variation of text, such as programming code, URLs for data objects and other statements.

The notification service 818 may be a collection of computing resources configured to enable customers 804 to send and receive notifications through a communications network 806. A customer 804 may utilize an interface, provided by the computing resource service provider 802, to create or subscribe to one or more subjects to which one or more messages may be published through. For instance, a customer 804 may use the interface to create a new subject and subscribe to this subject by specifying that any messages published to the subject may be transmitted to a particular location (e.g., electronic mail address, one or more servers, an existing queue within the managed queuing service 816, etc.). Accordingly, when a customer 804 publishes a message to the subject, the message may be transmitted to each recipient subscribed to the subject.

The archival data storage service 820 may provide a multi-tenant or multi-customer environment where each tenant or customer 804 may store, retrieve, delete or otherwise manage data in a data storage space allocated to the customer 804. The data stored by the archival data storage service 820 may be organized into data objects. The data objects may have arbitrary sizes except, perhaps, for certain constraints on size. Thus, the archival data storage service 820 may store numerous data objects of varying sizes. The archival data storage service 820 may operate as a key value store that associates data objects with identifiers of the data objects. The identifiers of the data objects which may be used by the customer 804 to retrieve or perform other operations in connection with the data objects stored by the archival data storage service 820. Access to the archival data storage service 820 may be through appropriately configured API calls, such as web service calls to one or more web servers of the archival data storage service 820.

Figure 9:
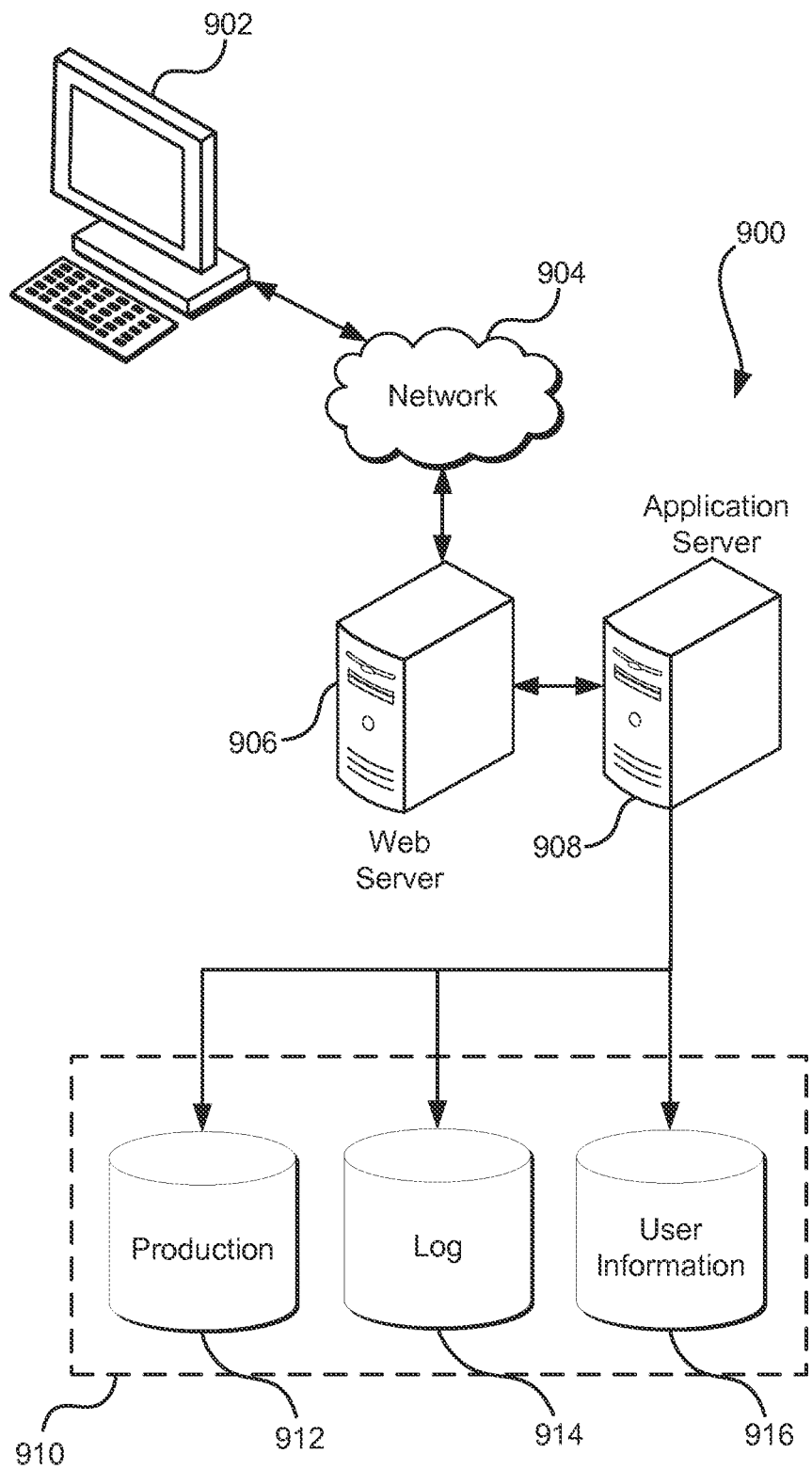
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   determining a plurality of data storage host pairs having a respective first and second storage host corresponding to a respective first and second physical storage location, the plurality of data storage host pairs determined based at least in part on physical characteristics of the respective first and second physical storage locations;
   for each data object of a plurality of data objects, using a redundancy encoding scheme to generate a plurality of data fragments;
   distributing the plurality of data fragments among at least a subset of the plurality of data storage host pairs according to one or more placement rules based at least in part on the physical characteristics of the respective first and second physical storage locations, wherein distribution of the plurality of data fragments is performed to avoid a possibility of correlated loss of multiple data fragments of the plurality of data fragments by consolidation of data of a data storage host pair onto a single data storage host;
   selecting a data storage host pair from the plurality of data storage host pairs;
   selecting a data storage host from the selected data storage host pair;
   consolidating data from the selected data storage host pair onto the selected data storage host; and
   updating metadata for each data storage host of the selected data storage host pair to specify a location of data stored therein.

2. The computer-implemented method of claim 1, further comprising:
   determining an amount of used capacity for the selected data storage host pair; and
   determining, based at least in part on the amount of used capacity, whether the selected data storage host pair satisfies an emptiness threshold, the emptiness threshold specifying a point wherein all data fragments from the selected data storage host pair can be stored onto a single data storage host of the data storage host pair.

3. The computer-implemented method of claim 2, further comprising selecting the data storage host from the selected data storage host pair based at least in part on an amount of capacity used by each data storage host of the data storage host pair.

4. The computer-implemented method of claim 1, further comprising removing one or more unselected data storage hosts from the data storage host pair upon updating the metadata for each data storage host of the selected data storage host pair.

5. The computer-implemented method of claim 1,
wherein the plurality of data storage host pairs comprise a respective first and second storage host;
wherein the first storage host is defined by a first physical storage location; and
wherein the second storage host is defined by a second physical storage location that is different from the first physical storage location.

6. The computer-implemented method of claim 5, wherein:
the distributing the plurality of data fragments among at least a subset of the plurality of data storage host pairs occurs such that no data storage host pair receives more than a maximum number of data fragments of the same data object, and
wherein distribution of the plurality of data fragments is further performed to avoid a loss of more than the maximum number of data fragments due to loss of a storage host in the plurality of host pairs.

7. A system, comprising at least one computing device configured to implement one or more services, wherein the one or more services are configured to:
for each data object of a plurality of data objects that has been redundancy encoded to generate a plurality of data fragments, distribute the plurality of data fragments among a plurality of data storage host groupings according to one or more placement rules based at least in part on the physical characteristics of a respective plurality of physical storage locations that define the plurality of data storage host groupings, such that consolidation of data of a data storage host grouping to fewer data storage hosts maintains compliance with one or more conditions for independent failure of the plurality of data fragments of the plurality of data objects;
select a data storage host grouping from a plurality of data storage host groupings, the plurality of data storage host groupings storing a plurality of data fragments, each data fragment of the plurality of data fragments;
determine to consolidate data of the data storage host grouping onto fewer data storage hosts;
consolidate the data of the data storage host grouping onto fewer data storage hosts; and
remove at least one data storage host from the selected data storage host grouping.

8. The system of claim 7, wherein the one or more conditions for independent failure of the plurality of data fragments of the plurality of data objects specify that the one or more conditions are not violated as a result of consolidation of the data of the data storage host grouping onto fewer data storage hosts.

9. The system of claim 7, wherein the data storage host groupings are data storage host pairs, each data storage host pair comprising two data storage hosts.

10. The system of claim 7, wherein the plurality of data objects are redundantly encoded using an erasure coding scheme.

11. The system of claim 7, wherein the one or more services are further configured to distribute the plurality of data fragments among the plurality of data storage host groupings in a manner such that one data fragment is stored within each data storage host grouping of the plurality of the data storage host groupings.

12. The system of claim 7, wherein the one or more services are further configured to add the removed at least one data storage host to another data storage host grouping.

13. The system of claim 7, wherein determination whether to consolidate the data of the data storage host grouping onto fewer data storage hosts is based at least in part on the data storage host grouping having satisfied an emptiness threshold.

14. The system of claim 7, wherein the fewer data storage hosts are selected based at least in part on an amount of capacity used by each data storage host of the data storage host grouping.

15. A non-transitory computer-readable storage medium having stored thereon executable instructions that, if executed by one or more processors of a computer system, cause the computer system to at least:
for each data object of a plurality of data objects that has been redundancy encoded to generate a plurality of data fragments, distribute the plurality of data fragments among a plurality of data storage host groupings according to one or more placement rules based at least in part on the physical characteristics of a respective plurality of physical storage locations that define the plurality of data storage host groupings, such that consolidation of data of a data storage host grouping to fewer data storage hosts maintains compliance with one or more conditions for independent failure of the plurality of data fragments of the plurality of data objects;
select, from the plurality of data storage host groupings, a data storage host grouping;
select fewer data storage hosts than a number of data storage hosts comprising the selected data storage host grouping;
consolidate the data of the selected data storage host grouping onto the fewer data storage hosts; and
remove at least one data storage host from the selected data storage host grouping.

16. The non-transitory computer-readable storage medium of claim 15, wherein the instructions further comprise instructions that, when executed by the one or more processors, cause the computer system to update metadata for each data storage host of the selected data storage host grouping to specify a location of data stored therein.

17. The non-transitory computer-readable storage medium of claim 15, wherein the instructions further comprise instructions that, when executed by the one or more processors, cause the computer system to add the removed at least one data storage host to another data storage host grouping.

18. The non-transitory computer-readable storage medium of claim 15, wherein the instructions further comprise instructions that, when executed by the one or more processors, cause the computer system to:
determine an amount of capacity used by a plurality of data storage hosts of a data storage host grouping;
identify, for each data storage host of the plurality of data storage hosts of the selected data storage host grouping, an amount of used capacity; and
determine, based at least in part on a sum of the amount of used capacity for each data storage host, whether the sum satisfies an emptiness threshold for the selected data storage host grouping.

19. The non-transitory computer-readable storage medium of claim 15, wherein the fewer data storage hosts are selected based at least in part on an amount of capacity used by each data storage host of the selected data storage host grouping.

20. The non-transitory computer-readable storage medium of claim 15, wherein the one or more conditions for independent failure of the plurality of data fragments of the plurality of data objects specify that the one or more conditions are not violated as a result of consolidation of the data of the data storage host grouping onto the fewer data storage hosts.

21. The non-transitory computer-readable storage medium of claim 15, wherein the plurality of data objects are redundantly encoded using an erasure coding scheme.

22. The non-transitory computer-readable storage medium of claim 15, wherein the instructions further comprise instructions that, when executed by the one or more processors, cause the computer system to distribute the plurality of data fragments among the plurality of data storage host groupings in a manner such that a limited number of data fragments are stored within each data storage host grouping of the plurality of the data storage host groupings.

* * * * *